United States Patent

Negas et al.

[11] Patent Number: 5,620,638
[45] Date of Patent: Apr. 15, 1997

[54] BARIUM OXIDE-RARE EARTH OXIDE-TITANIUM DIOXIDE BASED CERAMICS EXHIBITING ISOTROPY

[75] Inventors: Taki Negas, Frederick; Steven Bell, Hagerstown, both of Md.

[73] Assignee: Trans Tech, Inc., Adamstown, Md.

[21] Appl. No.: 241,668

[22] Filed: May 12, 1994

Related U.S. Application Data

[63] Continuation of Ser. No. 898,163, Jun. 12, 1992, abandoned, which is a continuation of Ser. No. 569,146, Aug. 17, 1990, abandoned.

[51] Int. Cl.$^6$ ........................................... C04B 35/465
[52] U.S. Cl. ............................ 264/61; 264/65; 264/66; 264/177.11; 501/139
[58] Field of Search ...................... 501/139; 264/61, 264/177.11, 65, 66

[56] References Cited

U.S. PATENT DOCUMENTS

| | | | |
|---|---|---|---|
| 3,956,440 | 5/1976 | Deshamps | 264/61 |
| 4,330,631 | 5/1982 | Kawashima et al. | 501/139 |
| 4,525,767 | 6/1985 | Alexander | 501/139 |

*Primary Examiner*—James Derrington
*Attorney, Agent, or Firm*—Nikaido, Marmelstein, Murray & Oram LLP

[57] ABSTRACT

Ceramics resulting from the oxide system barium oxide-rare earth oxide-titanium oxide have been found to exhibit an isotropy with respect to electrical properties such as the temperature coefficient of frequency at the first resonant frequency, dielectric constant, and, to some extent, the loss factor, Q. Such anisotropy effects reproducibility in fabricating ceramic articles for use in the microwave region and in the performance of these articles. Isotropic ceramics from the same ternary oxide system can be made by compacting non-nucleated powders followed by the usual sintering of the green compact. Anisotropic bulk ceramic workpieces can be machined to reproducibiy afford ceramic articles with the appropriate value of the electrical property in question by measuring the components of the electrical property along the three principal axes of the workpiece, and then determining the angles between the principal axes necessary to give a resultant having the preselected value.

5 Claims, 3 Drawing Sheets ized 5,620,638

BARIUM OXIDE-RARE EARTH OXIDE-TITANIUM DIOXIDE BASED CERAMICS EXHIBITING ISOTROPY

This application is a continuation of application Ser. No. 07/898,163 filed Jun. 12, 1992, now abandoned, which in turn is a continuation of application Ser. No. 07/569,146, filed Aug. 17, 1990 now abandoned.

BACKGROUND OF THE INVENTION

Ceramics which are prepared from oxides of the system barium oxide-titanium oxide-rare earth oxide, where the rare earth is one of the lanthanum series, have found broad use in components used in the microwave region of the electromagnetic spectrum, especially as filters. Recently it was observed that certain electrical properties, such as the temperature coefficient of frequency, $T_f$, were highly variable, depending upon the forming process used and the method of sampling the ceramic for electrical testing. Since reproducible electrical properties are a prerequisite in providing ceramics for the microwave industry these observations were understandably vexing and led to a program whose purpose was the elucidation of the origin of the observed variability. To our surprise we discovered that barium oxide-rare earth oxide-titanium oxide ceramics made via prereacting (calcining) a suitable powder, forming using uniaxial pressing, and sintering exhibited anisotropy with respect to the electrical properties in question. Although anisotropy in other ceramics has been recognized previously, there is no hint or suggestion of anisotropy in the class of ceramics under discussion. Once the existence of anisotropy was observed as the source of the problem of variability in electrical properties, two avenues of addressing the problem became clear. One avenue involved the preparation of the same class of ceramics but with the anisotropy eliminated. The second avenue accommodates anisotropy by first recognizing and measuring its degree, and then machining the apparatus along appropriate dimensions to reproducibly and consistently furnish ceramic articles reflecting the desired values of selected electrical properties. Quite related to the latter is the production of ceramic articles having the desired values of selected electrical properties maximized or minimized. In turn these are merely specific manifestations of the more general characteristic of reproducibly obtaining a preselected set of values of electrical properties from a bulk ceramic workpiece exhibiting anisotropy with respect to the electrical properties of interest.

SUMMARY OF THE INVENTION

The purpose of this invention is to reduce or eliminate difficulties arising from anisotropy in barium oxide-rare earth oxide-titanium dioxide based ceramics with respect to electrical properties in the radiofrequency and microwave portion of the electromagnetic spectrum. One embodiment comprises the preparation of isotropic ceramics by pressing or extruding unreacted, non-nucleated powders of the suitable oxides followed by sintering at a temperature in the range of about 1250° to about 1450° C., most preferably at 1300°–1380° C. Another embodiment is a process for machining the desired article from an anisotropic bulk ceramic workpiece at that angle, defined by the principal axes of the workpiece and components of the anisotropic electrical property along each principal axis, so as to give a ceramic article with the desired value of the electrical property as measured by a defined sampling method.

DESCRIPTION OF THE INVENTION

It often is the case that the most perplexing and difficult portion of a technological problem is the recognition of the underlying cause or nub of the problem. Once the basis of the problem has been recognized, it frequently is relatively straightforward to devise means to solve the problem, to avoid the problem, or in some cases even to utilize some features of the problem to achieve new results. Our invention is but another in a long line of such instances and can perhaps be best appreciated by exemplifying the characteristics of the underlying problem. It can be mentioned here that we were sufficiently fortunate to be able to incorporate some of the underlying bases of the problems into novel methods of fabricating ceramic articles used in the radiofrequency and microwave region.

One class of ceramics which enjoy broad use in components, especially filters, which are used in the microwave region is that arising from mixtures of $BaO:Ln_2O_3:TiO_2$ which, after reaction, form a region of solid solutions extending from mixtures whose mole ratio of oxide components is 3:2:9 through 1:1:4 to about 2:2.3:9, where Ln represents a member of the lanthanum rare earth series, i.e., elements of atomic number 57–71. Within this region the ceramics have relatively high values of the dielectric constant, E', of about 60–110 and show a rather moderate loss factor, Q, in the range of 1,000–4,000 at frequencies on the order of 3 $GH_z$. Our journey begins with the observation that a powder of composition 1:1:4, where the rare earth was samarium, upon calcination (prereaction, or presintering) at 1200° C., uniaxial pressing, and finally sintering at 1300°–1380° C. could yield a ceramic with highly variable $T_f$ depending upon the forming process used and on the method of sampling the ceramic for electrical testing.

EXAMPLE 1

Figure 1:
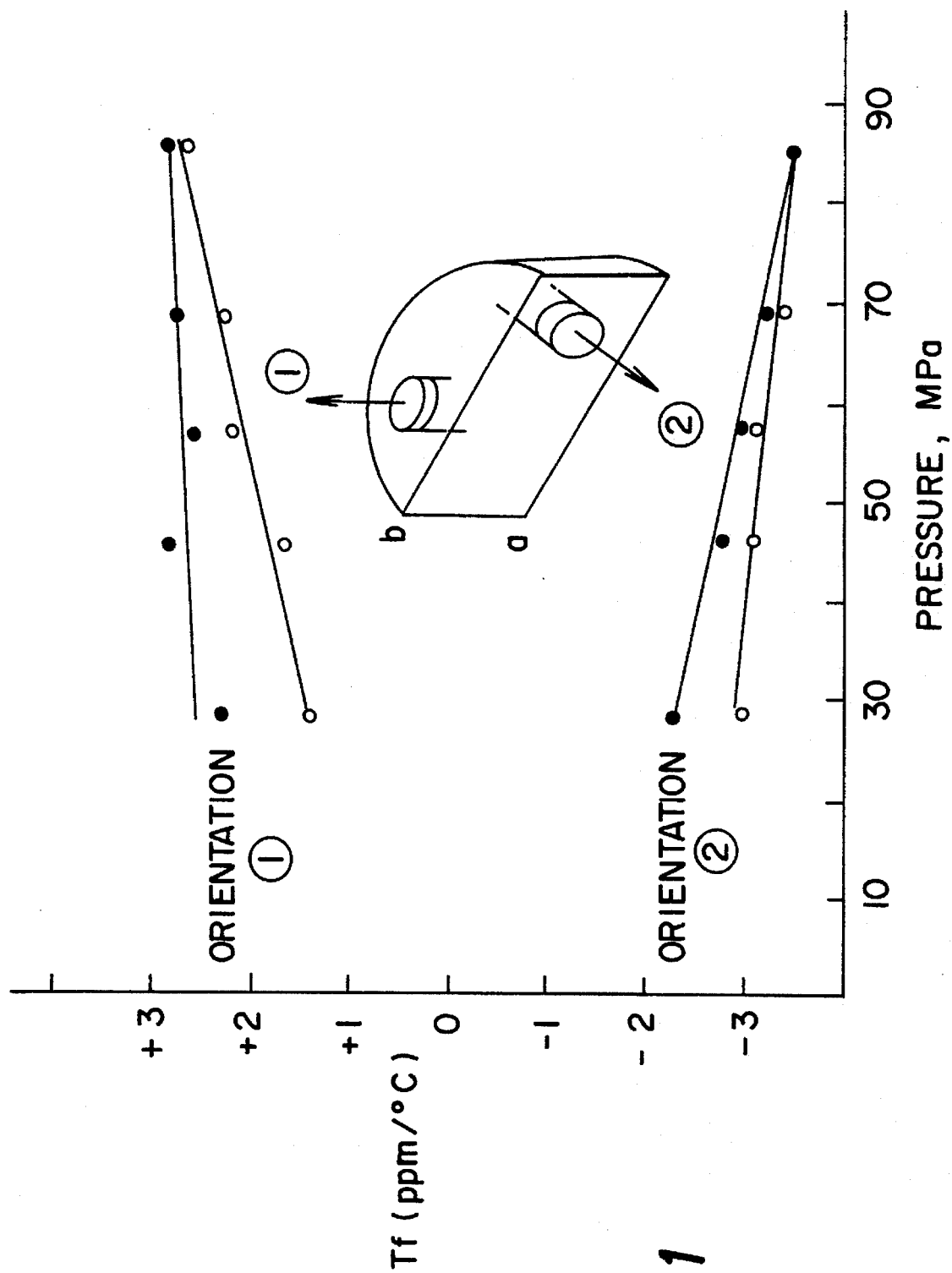
FIG. 1 is a graphical representation of the temperature coefficient of expansion as measured along two directions for samples uniaxially pressed (solid circles) and samples first uniaxially pressed, then isostatically overpressed at >100 MPa (open circles).

Five large, dimensionally precise pucks, or cylinders, of dimension 6 cm across by 3 cm high were formed from a barium oxide-samarium oxide-titanium oxide powder whose components were in the mole ratio of 1:1:4.5, each at a different uniaxial pressure. The pucks were cut in half, and one set of halves was isostatically overpressed at greater than 100 MPa. All ten pieces were densified at 1330° C. to give materials of a density greater than 5.70 g/cc (<2% porosity). Every half-cylinder was machined to obtain a minimum of 2 orthogonal sets of test parts for $T_f$ measurement using cavity methods and the transverse electric first resonant frequency mode, $TE_{01\delta}$ (D. Kajfez and P. Gullion, "Dielectric Resonators," Artech. House, Norwood, Mass., 1987 (539)). The results are summarized in. FIG. 1, which shows that the ceramics in question exhibit anisotropy in $T_f$ that widens in magnitude as uniaxial pressure increases.

Figure 2A:
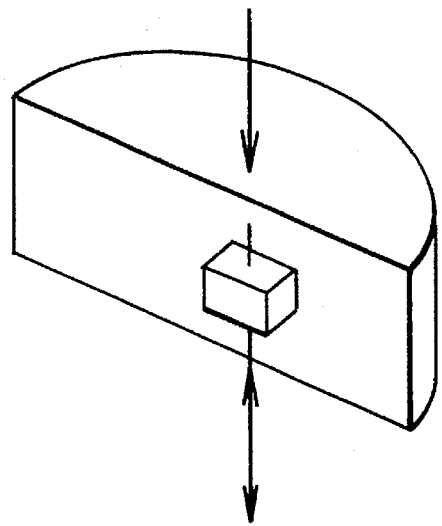
FIG. 2a shows the cube extracted from a puck for resonant frequency measurements with the relative orientations of cube and puck.
Figure 2B:
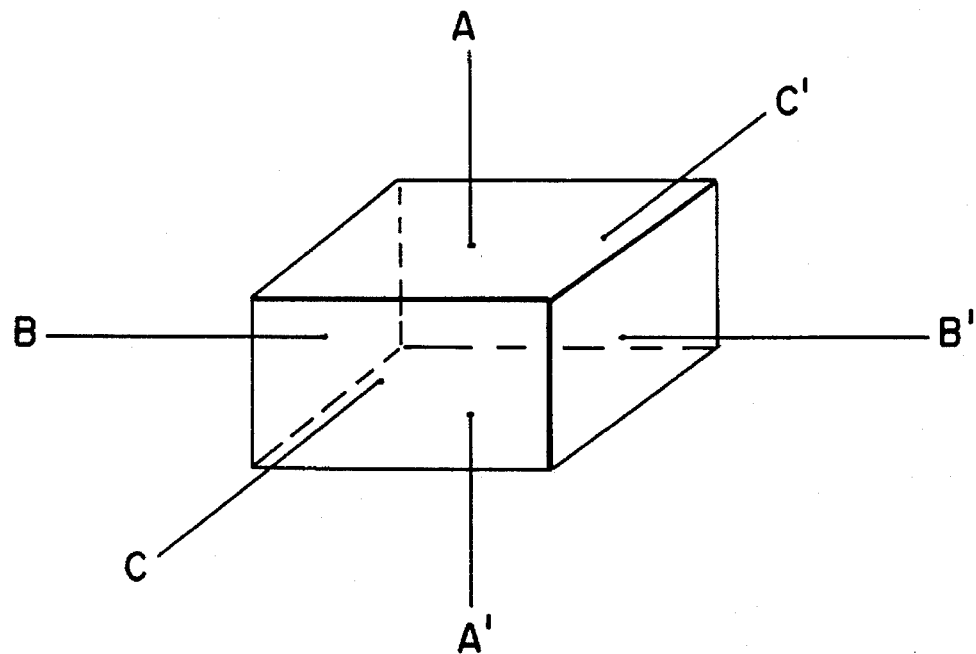
FIG. 2b depicts the axes along which measurements were made on the cube.

Isostatically overpressed parts retain the anisotropy imposed by the initial uniaxial pressing. Ceramics that are isostatically pressed only do not display anisotropy and yield $T_f=0\pm1$ ppm/°C. Anisotropy in E' was examined using the same test pieces and the parallel plate method (E. Courtnay, IEEE Trans. Mic. Th. and Tech., MTT-18, 476 (1970)). Small variations near the limit of error were observed, so a more sensitive but indirect method was developed; refer to FIG. 2. Cubes containing the uniaxial pressing direction as a unique 4-fold axis were precisely extracted and machined from all half-puck ceramics. These were coupled to a 50 Ω stripline, and the resonant frequency ($F_r$) was measured at six different cube orientations, i.e., each 4-fold axis, (+) and (−) direction, brought to the vertical position. If E' is isotropic, $F_r$ should remain constant for all cube orientations. Table 1 shows an E' anisotropy of −0.4 units, and the unique uniaxial pressing direction is easily discernable.

TABLE 1

| Anisotropy by the Cube Technique | |
|---|---|
| Axis[1,2] | $F_r$ (MHz) |
| A–A' | 4635.1 |
| A'–A | 4636.5 |
| B–B' | 4646.5 |
| B'–B | 4646.5 |
| C–C' | 4646.5 |
| C'–C | 4646.7 |

[1]·A–A' indicates measurements taken in direction from A to A'
[2]·The A–A' axis is the pressure axis, i.e., direction in which pressure was exerted.

The extensive data collected show that Sm-ceramics display anisotropy in $T_f$ of about 6 ppm/°C. and in E' of 0.4–0.7 units. The magnitude of the anisotropy within the 1:1:4–1:1:5–1:1:5 (+2 weight percent $TiO_2$) compositional region examined remains constant provided uniaxial pressure also is constant. This indicates that secondary phases (e.g. $TiO_2$) contribute little to the anisotropy. The largest E' and most positive $T_f$ are observed when the $TE_{01\delta}$ field during measurement is normal to the pressing direction. Almost within measurement error (±5% maximum), Q seems to remain constant but systematic trends in the data suggest that a slightly lower Q is associated with the more positive $T_f$ orientation. The ceramic, whose measurement results are summarized in Table 2 contains 0.2 weight percent less $TiO_2$ than the materials illustrated above. Measurements were made on samples extracted from the puck at different depths and at different orientations with respect to the pressure axis; see FIG. 3. Uniform but directional properties are clearly evident; note sample 8 which was extracted inclined to the pressing direction.

TABLE 2

Figure 3A:
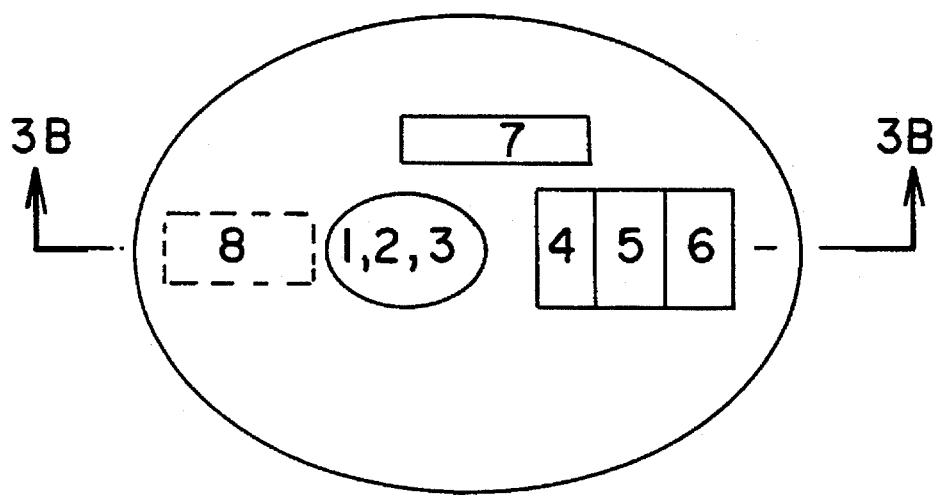
FIG. 3 shows the relative position and orientation of samples extracted from a samarium-ceramic puck.
Figure 3B:
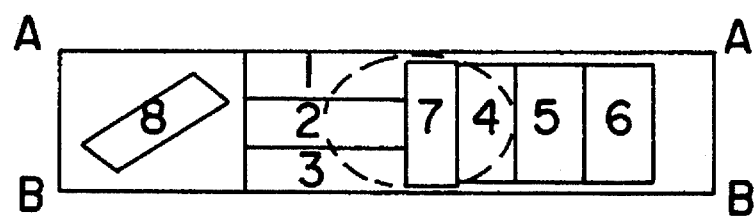

| Electrical Properties of Puck Samples Extracted According to FIG. 3. | | | | |
|---|---|---|---|---|
| Sample | Q (2.9 GHz) | $T_f$ | E' | Density (g/cc) |
| 1 | 3480 | −0.7 | 80.1 | 5.72 |
| 2 | 3525 | −0.5 | 79.6 | 5.71 |
| 3 | 3410 | −0.5 | 79.7 | 5.72 |
| 4 | 3710 | −6.5 | 79.2 | 5.71 |
| 5 | 3710 | −6.5 | 79.2 | 5.71 |
| 6 | 3710 | −6.3 | 79.4 | 5.72 |
| 7 | 3670 | −6.1 | 79.4 | 5.72 |
| 8 | 3700 | −2.0 | 79.5 | 5.72 |

It also is known that many other oxides, such as lead and bismuth oxides, can be added to the barium oxide-rare earth oxide-titanium oxide ceramics of this invention in order to "tune" their properties. It therefore became not merely of interest but also important to determine whether these ceramics also exhibited similar anisotropy.

EXAMPLE 2

Several samples of dense, commercial 1:1:4.(Nd):PbO pucks were made available and these were tested as above. The pucks must have been pressed uniaxially because anisotropy in $T_f$ of 14 ppm/°C. and in E' of −0.7 units are evident (Q≈2300, 3 GHz). $Bi_2O_3$-containing materials of the 1:1:4(Nd)-type (D. Kolar, Z. Stadler, S. Gaberscek, and D. Suvorov, Ber. Dt. Keram. Gas. 55, 346 (1978)) were fabricated by isostatic and by uniaxial pressing, then densified. The latter show anisotropy of 22 ppm/°C. and −3 units in $T_f$ and E', respectively. Isopressed parts are relatively uniform, $T_f$≈10 ppm/°C. and E'≈91 (Q≈1800, 3 GHz).

Although we do not wish to be bound by any theory, and have not obtained the requisite experimental evidence to unambiguously support any particular theory, we have developed a working hypothesis and associated model which appears to account for much of our observations. First it is assumed that powder which has been heated at 1200° C. (pre-sintering or proreaction temperature) and milled to an average particle size near two microns contains nuclei of appropriate composition that have acicular habit, that is, are pencilshaped. We then speculate that some fraction of the nuclei is aligned during uniaxial forming with their long axis (or axes) perpendicular to the pressing direction. Most of this alignment is accomplished at the lowest pressures. On the other hand, isostatic pressing does not cause any preferred orientation. But when isostatic pressing is applied to uniaxially pressed parts of low green density, the alignment of nuclei is preserved with only minor disruption. During densification, prooriented nuclei grow in the plain normal to the initial pressing direction at the expense of smaller particles and of adjacent secondary phases as chemical equilibrium is attained. The remainder of the ceramic also undergoes similar changes, but they are directionally random. The resultant product consists of a matrix of random crystallites plus a small volume fraction of oriented grains giving rise to the observed anisotropy in various electrical properties.

This model assumes that nuclei of, e.g., 1:1:4 oxides exist in the processed powder. Therefore, their availability and concentration should be dictated by the magnitude of the initial calcination temperature. To test this, barium titanate, samarium oxide, and titanium dioxide (rutile) of a composition appropriate to give the 1:1:4 composition of the prior example were blended in alcohol, dried, and reblended. Samples of this powder, which of necessity contained no nuclei of the ceramic material. were pressed uniaxially and isostatically (90 MPa) and densified at 1330° C. Fired densities were 5.60 g/cc (<4% porosity), sufficient to yield E'≈77 and Q≈3.2K (3 GHz). Both ceramics gave the same $T_f$ =−3.1 ppm/°C. and the cube test showed no frequency variation indicating a complete lack of anisotropy.

Where anisotropy in the ceramics of the barium oxide-rare earth oxide-titanium oxide class is intolerable, or even merely inconvenient, it can be avoided by using ceramics which are isotropic. These ceramics, of the same barium oxide-rare earth oxide-titanium oxide system, can be prepared merely by avoiding the formation of crystal nuclei prior to compaction. This can be done by pressing powders which have not been prosintered or proreacted, or which at the very least have been calcined at a temperature insufficient to cause nucleation. Compaction of the non-nucleated powders can be effected either by uniaxial or isostatic pressing at pressures which are typically in the region from 30 MPa to about 90 MPa, or by extrusion. The compacted pieces then can be sintered under usual conditions, which means temperatures in the range of about 1250°–1450° C., but most usually at around 1300°–1380° C., for a time which is typically on the order of 8 hours. The resulting ceramics will show densities indicating less than 5% porosity. Other electrical properties will be essentially unchanged from those found in the same ceramics exhibiting anisotropy, with the major functional difference being that all electrical properties will have the same value in every direction.

On the other hand, the fact of anisotropy in the subject class of barium oxide-rare earth oxide-titanium oxide ceramics can be exploited, or at least accommodated, in several distinct ways, all of which have as their common theme that if a value, $<\alpha>$, of an electrical property $\alpha$ is dependent on the direction in which the property is measured, $\alpha$ then can be considered a vector which is the resultant of its components along the three principal axes of the workpiece. For simplicity of discussion we will choose cartesian coordinates as our three principal axes, but it will be readily appreciated that another set of axes, such as those for a spherical coordinate system, also can be used with equal facility.

If maintaining the reproducibility and constancy of the value, $<\alpha>$, in any arbitrary but predefined direction is a prime consideration, then knowledge of the components of $\alpha$ along the three principal axes permits machining the workplace in such a way as to obtain ceramic particles exhibiting the same values of $\alpha$ along the predefined direction. This is more readily understood with reference to a specific example. FIG. 4 shows a cylindrical workpiece, or puck, manifesting anisotropy along its z axis. Let us exemplify $\alpha$ by $T_f$, and assume $T_f=10$ ppm/°C. along the z axis and 0 ppm/°C. along the x and y axes. Let us further assume for illustration that the desired value, $<\alpha>$, in this case is $T_f=5$ ppm/°C. and that the ceramic article is a wafer where $T_f$ typically is measured along the direction given by the thickness of the wafer. Since in the workpiece the components of $T_f$ along the x and y axes are zero then $<T_f>=10$ ppm/°C. $\cos\theta$ where, $\theta$ is the angle between the z axis and the plane of the x-y axis. Since it is desired that $<T_f>=5$ ppm/°C., $\cos\theta=0.5$. or $\theta=60°$. That is, the workpiece is cut so as to give wafers where the direction of wafer thickness is 60° from the z axis.

The example above can be generalized in order to obtain a preselected value or set of values of one or more electrical properties along a predefined direction in a final ceramic article which is fabricated from a bulk ceramic workpiece exhibiting anisotropy in the electrical properties of interest. The first stage in this method is to determine the principal axis of maximum anisotropy and to establish the value of the electrical properties in question along this principal axis. The value of the same electrical property needs to be established along the other two principal axes. Each of the measured values of the electrical property in question corresponds to the component of that property along the relevant principal axis. Knowing the direction along which the electrical property is to be measured in the final ceramic article, and recognizing that this is merely the vectorial resultant of the values found along the first, second, and third principal axes, one then can readily calculate the angles as defined by the three principal axes along which the anisotropic workpiece needs to be machined to afford the ceramic article with the predetermined electrical value or set of electrical values. By machining the workpiece we include such processes as cutting, grinding, polishing, and other analogous processes which will afford smaller ceramic articles of appropriate shape and dimension from the larger bulk workpiece.

This same method is applicable not only to reproducibly obtaining a preselected value or set of values of some electrical property, but also may be used either to maximize or to minimize the value of at least 1 electrical property along the direction in question. Among the electrical properties of interest are included the temperature coefficient of frequency, the temperature coefficient of capacitance, the dielectric constant, and the loss factor, Q.

It should be clear that the methodology which is described above can be used not only to give articles with reproducibly precise values of a particular electrical property or set of properties, but also can be used to minimize loss (maximize utilization) in fabricating small ceramic articles from a bulk workpiece. Clearly, both are desirable outcomes and merely add to the advantages afforded by our methods.

What is claimed is:

1. A method of making a ceramic article manifesting isotropic values of electrical properties, where the ceramic is a member of the barium oxide-rare earth oxide-titanium oxide system having a composition whose boundaries are defined by mole ratios of the oxides of 3:2:9, 1:1:4, and 2:2.3:9, comprising presintering a powder of appropriate composition at a temperature of 1200° C. or higher, isostatically pressing the presintered powder at a pressure from 30 to about 90 MPa, followed by sintering the pressed powder at a temperature from about 1250° C. to about 1450° C.;

thereby obtaining a ceramic article having isotropic values of electrical properties.

2. The method of claim 1 where the electrical property is the temperature coefficient of frequency.

3. The method of claim 1 where the electrical property is the temperature coefficient of capacitance.

4. The method of claim 1 where the electrical property is the dielectric constant.

5. The method of claim 1 where the pressed powder is sintered at a temperature from about 1300° C. to about 1380° C.

* * * * *